Patented July 3, 1928.

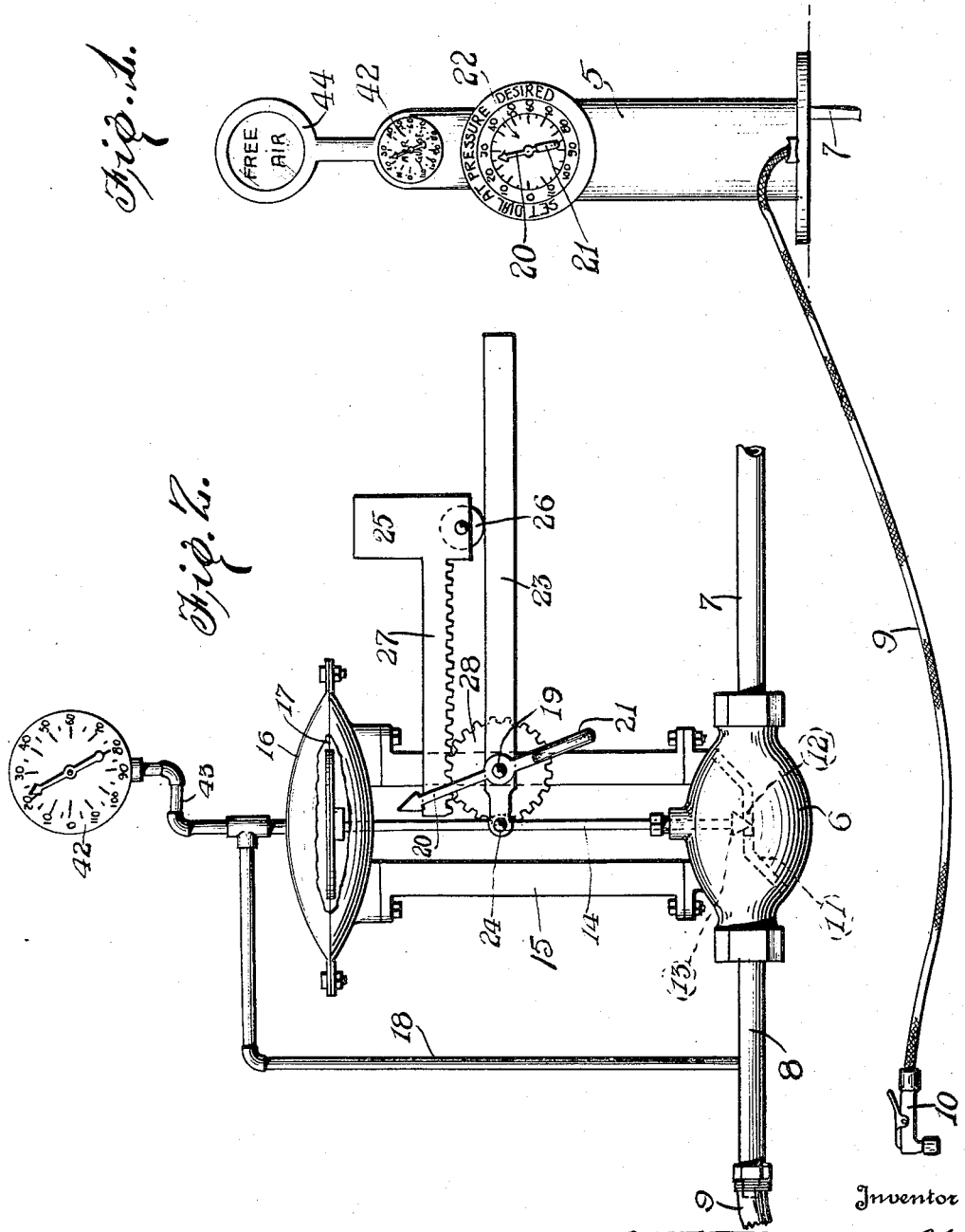

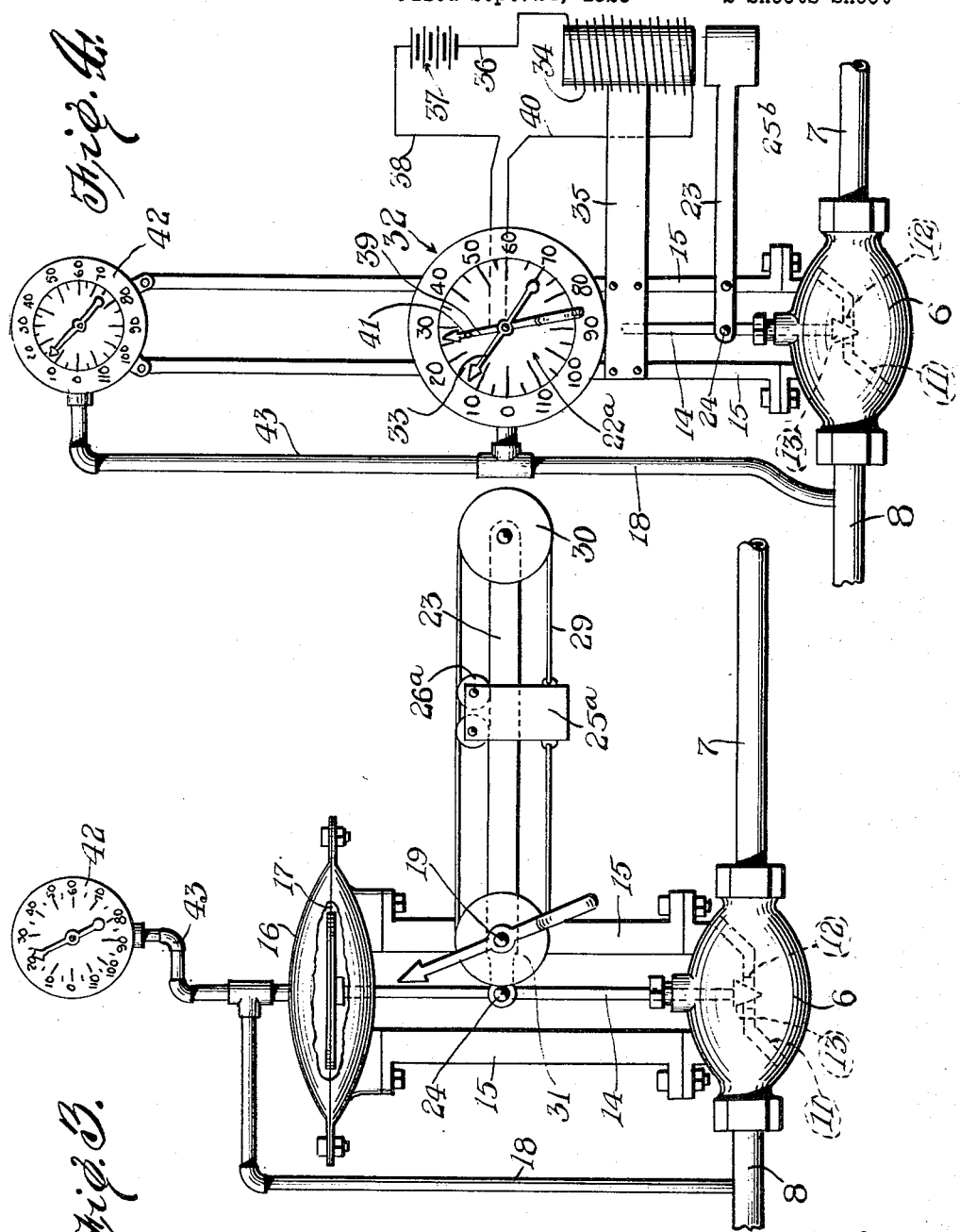

1,676,139

UNITED STATES PATENT OFFICE.

OLIN F. FLUMERFELT, OF HAMBURG, NEW YORK.

TIRE-INFLATING APPARATUS.

Application filed September 24, 1926. Serial No. 137,616.

This invention relates to tire inflating apparatus, and has more particular reference to an apparatus of this kind which may be conveniently employed to supply tires with air to a predetermined pressure.

The primary object of the present invention is to provide means to automatically cut off the supply of air to a pneumatic tire or the like when the pressure has reached a predetermined desired point, the device being capable of being quickly set to cut off at any desired pressure.

A further object is to provide a tire inflating apparatus of the above character which is extremely simple and durable in construction as well as efficient in operation.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a front elevational view of a tire inflating apparatus constructed in accordance with the present invention;

Figure 2 is an enlarged fragmentary elevational view showing details of construction of the device shown in Figure 1;

Figure 3 is a view similar to Figure 2 illustrating a modified form of the invention; and Figure 4 is a view similar to Figures 2 and 3 illustrating a further modified form of the invention.

Referring more in detail to the drawings, the present invention preferably embodies a hollow supporting stand 5 adapted to be suitably erected at a motor vehicle service station or the like and having a suitable air control valve 6 suitably mounted therein adapted to be connected at its inlet side by means of a pipe 7 with a suitable source of supply of air under pressure, such as an air storage tank or pump, the valve 6 being connected at its outlet side by means of a pipe 8 to a suitable flexible conduit or hose 9 that extends outwardly through the supporting stand 5 and is equipped upon its outer free end with the usual nozzle 10 for engaging and opening the conventional inflation valve of a pneumatic tire.

The valve 6 is of a conventional form embodying a partition 11 having an opening 12 therethrough in which is adapted to seat a valve head 13 carried by a reciprocable valve stem 14 slidably projecting through the top of the valve casing. It will be understood that when the valve stem 14 is forced downwardly the valve head 13 will be caused to seat in the opening 12 for shutting off the flow of air through the valve and consequently cutting off the supply of air from the supply pipe 7 to the hose 9, while upon lifting the stem 14 and the valve head 13, the port 12 will be opened for permitting free flow of air from the supply pipe 7 to the hose 9.

Suitably mounted, as by means of brackets 15 above the valve 6 is a pressure responsive device which, in the forms of the invention shown in Figures 2 and 3, consists of a casing 16 having a flexible diaphragm 17 mounted therein, the valve stem 14 being extended through the bottom of the casing 16 and engaging the underside of diaphragm 17 as shown. The diaphragm 17 divides the casing 16 into upper and lower chambers, and a suitable conduit 18 connects the upper chamber with the pipe 8 so as to place said upper chamber into communication with the outlet side of valve 6.

Journaled in one of the brackets 15 and through the front of the stand 5 is a horizontal shaft 19 having a pointer 20 fixed upon the projecting forward end thereof, said pointer being equipped with a suitable lever or handle 21 for facilitating its manual rotation and being arranged to cooperate with an arcuate or circular series of pound indicating graduations provided upon the face of a dial plate or disk 22 suitably provided upon the front of the stand 5 concentric with the shaft 19.

Freely pivoted upon the shaft 19 within the stand 5 is a lever 23 having a short arm pivotally attached to the valve stem 14 as at 24, and adjustable longitudinally of the outer longer arm of lever 23 by turning of the pointer 20 is a weight 25. In the form of the invention shown in Figure 2, the weight 25 is provided with a suitable antifriction wheel 26 adapted to roll upon the upper edge of lever 23, suitable means being provided to guide the weight in its movement, and rigid with and projecting inwardly from the weight 25 parallel with lever 23 is a rack bar 27 which meshes with and is disposed above a spur pinion 28 fixed upon the shaft 19.

The construction of Figure 3 is similar to that of Figure 2 except that the weight 25ª in Figure 3 is suspended from the lever 23, the same having anti-friction wheel 26ª at the top thereof arranged to roll upon the upper edge of lever 23, and having one end of a flexible member or rope 29 attached to the outer side thereof, said flexible member 29 passing outwardly and around a pulley 30 journaled on the outer end of the lever 23 and then passing inwardly and around another pulley 31 fixed upon the shaft 19, from whence the flexible member 29 extends to and is attached to the inner side of the weight 25ª. In either instance the weight 25 or 25ª is manually adjustable longitudinally of the longer outer arm of lever 23 by turning the pointer 20 for varying the amount of force necessary for pushing the valve stem 14 downwardly and seating the valve head 13.

In operation, assuming that a person desires to inflate a tire at 30 pounds pressure, he will turn the pointer 20 clock-wise until it coincides with the 30 pound-indicating graduation of the dial 22, during which operation of pointer 20 the weight 25 or 25ª is moved outwardly on the outer longer arm of lever 23 to a predetermined position wherein 30 pounds of pressure upon the stem 14 is required to close the valve head 13. The nozzle 10 is then engaged with the tire valve in the usual manner, which releases the air pressure at the outlet side of valve 6 and allows the weight 25 or 25ª to swing lever 23 for raising valve stem 14 and opening the valve head 13. The air under pressure then freely flows from the air supply pipe 7 through the valve 6, pipe 8 and hose 9 into the tire. When the air pressure in the tire reaches the desired pressure of 30 pounds, a corresponding pressure will be had in the conduit 18 and the upper chamber of casing 16 so that this air pressure will press downwardly on the diaphragm 17 and thereby lower valve stem 14 for causing the valve head 13 to seat in and close the valve port 12. This downward movement of valve stem 14, besides effecting closing of the valve 6 and consequently cutting off the supply of compressed air to the tire, also causes the lever 23 to be swung against the action of the weight 25 or 25ª. Obviously, if the required pressure were more than 30 pounds, the pointer 20 would have been set to such required greater pressure indication on dial 22 so that the weight 25 or 25ª would have been moved further outwardly away from the pivot or fulcrum of lever 23, thus requiring a greater pressure on the diaphragm 17 to close the valve 13. On the other hand, should the required pressure be less than 30 pounds, the weight 25 or 25ª would not have been adjusted quite so far outwardly away from the pivot or fulcrum of lever 23 when the pointer 20 had been properly set, so that such lesser pressure would be sufficient to effect closing of valve 13 to cut off the air supply to the tire at the required pressure.

In the form of the invention shown in Figure 4 the pressure responsive device connected to the outlet side of valve 6 by pipe 8 and conduit 18 consists in a conventional pressure gage generally indicated at 32 having a graduated dial 22ª similar to the dial 22 and embodying an indicating hand 33 movable over the face of said dial 22ª, the conduit 18 being connected to the pressure inlet of the pressure gage 32. The lever 23 in this form of the invention is also pivotally attached to the valve stem 14 and, besides being weighted as at 25ᵇ at its outer end, constitutes an armature adapted to be attracted at its outer end by an electromagnet 34 suitably mounted thereabove as at 35. One side of the winding of magnet 34 is connected by means of a wire 36 with one side of a source of electricity such as a battery 37, the other side of which is connected by means of a wire 38 to a manually rotatable and adjustable pointer 39 rotatably mounted upon the shaft of pointer 33. The other side of the coil of magnet 34 is connected by means of a wire 40 with the pointer 33, the latter being suitably insulated from the pointer 39. In the operation of this form of the invention shown in Figure 4, the pointer 39 is first set to the desired pressure relative to the graduations of dial 22ª. The nozzle 10 is then engaged with the tire inflation valve and the air under pressure will be supplied to the latter, it being free to flow through the valve 6 by reason of the valve head 13 being held open by the weighted lever 23. As the pressure in the tire, and consequently at the outlet side of valve 6, increases, the pointer 33 of the pressure gage 32 will turn in a clock-wise direction, and as soon as this pressure in the tire reaches the desired pressure to which the pointer 39 has been previously set, said pointer 33 will cooperate with the pointer 39 for closing the circuit of magnet 34 so that the latter will attract the outer end of lever 23 and cause the latter to swing for closing the valve 6 and thereby shutting off the supply of air to the tire. As shown, the pointer 39 is equipped with a suitable contact 41 adapted to be engaged by the pointer 33 when the latter coincides with the pointer 39, for closing the circuit of magnet 34.

From the foregoing description it will be seen that I have provided a simple and durable as well as efficient tire inflating apparatus which may be conveniently employed to supply tires with air to a predetermined pressure, and wherein no objectionable or frail parts such as springs and the like are provided which may become quickly inaccurate in operation or readily broken.

In each form of the invention a conventional form of pressure gage 42 may be mounted in the top of the stand 5 above the dial 22 or 22ª and so as to have its dial and pointer exposed to view, the pressure inlet of the gage 42 being connected to a branch 43 of the conduit 18. This gage 42 is merely for the convenience of the user and serves no function in the air cut off operation. If the tire is up to pressure or over inflated at the beginning, the gage 42 will so indicate the same to the observer.

The top of the stand 5, if desired, may be provided with any suitable form of ornamentation or sign as at 44.

From the above description it is believed that the construction and operation as well as the advantages of the present invention will be readily understood and appreciated by those skilled in the art.

Minor changes may be made without departing from the spirit and scope of the invention as claimed.

Any suitable form of packing may be employed to prevent leakage of air from the casing of valve 6 about the stem 14, but a diaphragm packing is preferred because it will offer little or no resistance to the movement of stem 14 and at the same time effectively prevent leakage. With the diaphragm type of packing, the valve will have a bonnet sealed by a flexible diaphragm attached to stem 14 and the stem 14 will have a loose sliding fit in the bonnet and valve casing, as will be apparent to those skilled in the art. Also, the diaphragm in the bonnet may be resilient and slightly tensioned to assist the upward movement of stem 14, and suitable means may be provided to limit the upward movement of said stem to a position wherein the valve is sufficiently opened.

What I claim as new is:—

1. An automatic tire inflating apparatus comprising a shut-off valve having an inlet adapted for connection with a source of supply of air under pressure and an outlet adapted for connection with a tire inflation hose, a weighted lever normally acting to open said valve, means including a pressure responsive device subjected to the air pressure at the outlet side of said valve for closing the latter against the action of said weighted lever, and means including a manually adjustable pressure indicator rotatable about the pivotal axis of said weighted lever for shifting the weight of the latter to vary the pressure required to be subjected to the pressure responsive device for effecting closing of said valve.

2. An automatic tire inflating apparatus comprising a casing, a shut-off valve mounted in the casing and having an inlet adapted for connection with a source of supply of air under pressure and an outlet adapted for connection with a tire inflation hose, a weighted lever in the casing normally acting to open said valve, means including a pressure responsive device in the casing subjected to the air pressure at the outlet side of said valve for closing the latter against the action of said weighted lever, a dial on the outside of the casing and means including a manually-adjustable pressure indicator associated with said dial and disposed on the outside of the casing for adjusting said first named means to vary the pressure required to be subjected to the pressure responsive device for effective closing of said valve.

In testimony whereof I affix my signature.

OLIN F. FLUMERFELT.